Figures 1, 2:
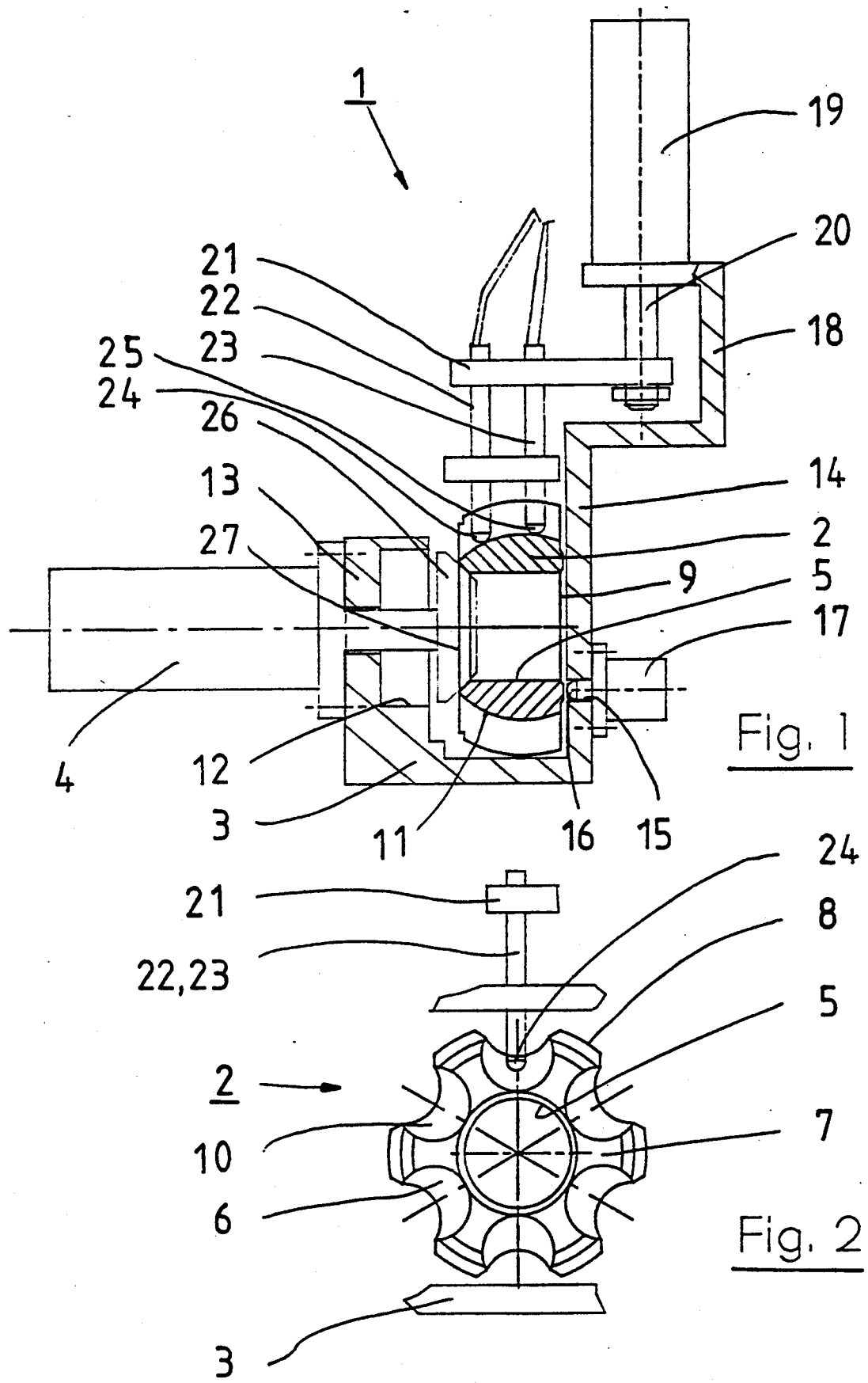

United States Patent [19]
Heymann

[11] Patent Number: 5,182,866
[45] Date of Patent: Feb. 2, 1993

[54] APPARATUS AND METHOD FOR IDENTIFYING THE LATERAL POSITION OF A WORKPIECE

[75] Inventor: Norbert Heymann, Dormagen, Fed. Rep. of Germany

[73] Assignee: GKN Automotive, Siegburg, Fed. Rep. of Germany

[21] Appl. No.: 700,527

[22] Filed: May 14, 1991

[30] Foreign Application Priority Data

May 18, 1990 [DE] Fed. Rep. of Germany ....... 4015957

[51] Int. Cl.$^5$ ........................... G01B 5/20; G01B 7/28
[52] U.S. Cl. ........................... 33/645; 33/549; 33/552; 33/712
[58] Field of Search ............... 403/13, 14, 27; 33/645, 33/549, 551, 552, 553, 710, 712, 613, 545, 546

[56] References Cited

U.S. PATENT DOCUMENTS

| | | | |
|---|---|---|---|
| 2,977,533 | 3/1961 | Savage | 33/551 |
| 3,869,800 | 3/1975 | Bartlett et al. | 33/555.1 |
| 4,914,827 | 4/1990 | Cook | 33/552 |
| 4,916,824 | 4/1990 | Shimazutsu et al. | 33/551 |

Primary Examiner—William A. Cuchlinski, Jr.
Assistant Examiner—C. W. Fulton
Attorney, Agent, or Firm—Harness, Dickey & Pierce

[57] ABSTRACT

In an automated production process it is essential that individual workpieces 2 should be in their accurate positions when being fed into the machining facility which follows. It is therefore the object of the present invention to provide a method and an apparatus for identifying the lateral position of a workpiece, especially a ball hub 2. In carrying out the method in accordance with the invention, first the presence of the workpiece 2 in its position when measured is identified by the reaction of a stationary sensor 17, subsequently the contour of the workpiece is scanned by at least two movable, spaced sensors 22, 23, and the position of the workpiece is identified by determining the difference in travel between the sensors 22, 23.

16 Claims, 1 Drawing Sheet

APPARATUS AND METHOD FOR IDENTIFYING THE LATERAL POSITION OF A WORKPIECE

DESCRIPTION

The invention relates to a method and an apparatus for identifying the lateral position of a workpiece with a circularly enveloped outer contour, especially a ball hub, which method and apparatus comprise a feeding assembly including a position of rest for the workpiece, a fixing member arranged at a right angle relative to the feeding device and movable in the direction of the workpiece axis, and position identifying means.

During the automated process of producing ball joints, the ball hubs are lifted individually by an elevator from the bulk of the ball hubs and while standing on their circumference, they are positioned in a suitable feeding assembly to be prepared for the subsequent production operation. This kind of feeding assembly, admittedly, ensures the required angular position, i.e. the ball hub is held while standing on two webs, but the true lateral position with the smaller diameter at the front end pointing in the direction of the fixing member cannot be ensured.

It is the object of the present invention to provide an apparatus and method which permit accurate identification of the position of the workpiece.

In carrying out the method in accordance with the invention, first the presence of the workpiece in its position when measured is identified by the reaction of a stationary sensor, subsequently the contour of the workpiece is scanned by at least two movable, spaced sensors, and the position of the workpiece is identified by determining the difference in travel between the sensors.

By selecting a suitable workpiece face and by moving the aligned sensors against it, it is possible, via the difference in travel between the two sensors, to find a specific criterion for the tru lateral position of the workpiece, the decisive factor being the comparison of absolute differences in travel between the two sensor values.

To carry out the method in accordance with the invention, there is provided a stationary sensor which may be actuated via the workpiece pressurised by the fixing member, with the position indicating means comprising at least one lifting cylinder unit whose movable part is provided with at least two sensors which record the contour of the workpiece which may have any shape.

The stationary sensor monitors the extent to which the workpiece is located in the required position of rest and the sensors of the lifting cylinder are able to scan the contour of the workpiece following the reaction of the stationary sensor.

The axis of the lifting cylinder unit is arranged at a right angle relative to the workpiece axis and/or relative to the feeding device. If the lifting cylinder is arranged at an angle relative to the removing member or for feeding purposes it is thus possible for the lifting cylinder to be aligned horizontally, perpendicularly or at an angle relative to a radial plane of the workpiece or relative to the axial direction of the fixing member, thereby permitting individual adaptation to the workpiece and allowing the contour with the greatest changes in shape being selected. With a ball hub, the track base of the ball tracks, for example, at its front end face pointing in the direction of the pressure cylinder, comprises a smaller diameter than at its rear end face.

To permit an even better adaptation of the sensors to the surface of different workpieces, the sensors of the movable part of the lifting cylinder unit are fixed so as to be adjustable relative to each other in the direction of said part and/or transversely thereto. Furthermore, the sensors of the movable part of the lifting cylinder unit are arranged so as to be spring-loaded in the direction of the lifting movement and consist of tactile sensors in order to prevent the workpiece from being damaged.

To permit actual data recording, the sensors, at their ends pointing in the direction of the workpiece, comprise path sensing points. The stationary sensor is arranged in the position of rest of the workpiece and is pressurised by the fixing member indirectly via the workpiece, thereby permitting the presence of the workpiece to be monitored. The sensors of the lifting cylinder have a path measuring purpose, thereby permitting the position of the workpiece to be identified. The fixing cylinder in this case is used for pressing the workpiece against the stationary sensor and for holding the workpiece in a defined position while the path is measured. If the ball hub is not located accurately in the true lateral position in the position of rest of the feeding groove, the ball hub is turned in a device specially provided for this purpose outside the feed assembly.

The design of the apparatus in accordance with the invention is illustrated in the drawing wherein FIG. 1 is a lateral view of the apparatus, partly in section, and FIG. 2 is a plan view of the workpiece also showing the arrangement of the sensors.

FIG. 1 shows an apparatus 1 for identifying the position of a workpiece 2. The workpiece 2 is positioned in a U-shaped feeding groove 3 arranged at a right angle relative to an axially movable pressure cylinder 4. In this case, the workpiece is a ball hub 2 according to FIG. 2 comprising a centric bore 5 and ball tracks 6 as well as a large number of webs 7.

The ball tracks 6 are each arranged between two webs 7 while being distributed symmetrically around the circumference 8. With the ball hub 2, the track base 10 of the ball tracks 6, for example, at its front end face 27 pointing in the direction of the pressure cylinder 4, comprises a smaller diameter 11 than at the rear end face 9. The position of the ball hub as illustrated in FIG. 1, with the smaller diameter 11 pointing in the direction of the pressure cylinder 4 arranged at a right angle, corresponds to the true lateral position as required.

At the level of the pressure cylinder 4, an aperture 12 is provided in the first arm 13 of the feeding groove 3 which permits the ball hub 2 to be pressurised by the conical head 26 of the pressure cylinder 4 to position and hold the ball hub 2 in the position of rest. The opposed arm 14 of the feeding groove 3 comprises a bore 15, with the path recording point 16 of the stationary sensor 17 projecting through the bore 15. The path recording point 16 is pressurised by the pressure cylinder 4 indirectly via the workpiece 2 and permits monitoring of the presence of the workpiece.

The arm 14 of the feeding groove comprises an extension 18 which is bent twice at a right angle and to which a lifting cylinder unit 19 is attached. The lifting cylinder unit 19 comprises an axially movable piston rod 20 and a bracket 21 bolted on at a right angle relative thereto and carrying two spring-loaded tactile sensors 22, 23 for path recording purposes. The two sensors 22, 23 are aligned in such a way that their path recording points 24, 25 touch a track base 10 of the ball track 6. The position of the workpiece may be identified by forming the difference between the two paths covered by the sensors 22, 23.

| List of reference numbers | |
|---|---|
| 1 | apparatus |
| 2 | workpiece/ball hub |
| 3 | feeding groove |
| 4 | pressure cylinder |
| 5 | bore in ball hub |
| 6 | ball tracks |
| 7 | web |
| 8 | circumference of ball hub |
| 9 | end face of ball hub |
| 10 | track base |
| 11 | diameter of ball hub |
| 12 | aperture |
| 13, 14 | arms |
| 15 | bore in feeding groove |
| 16, 24, 25 | path recording points |
| 17 | sensor |
| 18 | extension |
| 19 | lifting cylinder unit |
| 20 | piston rod |
| 21 | bracket |
| 22, 23 | sensor |
| 26 | head of pressure cylinder |
| 27 | end face of ball hub |

I claim:

1. A method of identifying the lateral position of a workpiece with a circularly enveloped outer contour in cross section and at least one asymmetric contour in longitudinal direction, especially a ball hub, comprising:
locating a workpiece in its position within a channel in a feeding assembly having a U-shape in cross section, defining a pair of parallel side walls and a bottom web with said channel therebetween, the axis of said outer contour of said workpiece lying transverse in said channel, said feeding assembly having a stationary sensor in one of the side walls;
scanning the contour of the workpiece with at least two movable spaced sensors positioned above the channel beside each other in transverse direction;
determining the difference in travel between the two movable sensors; and
identifying the lateral position of said workpiece.

2. An apparatus for identifying lateral position of a workpiece with a circularly enveloped outer contour in cross section and at least one asymmetric contour in longitudinal direction comprising:
a feeding assembly with a position of rest for the workpiece, said feeding assembly having a U-shape in cross section defining a pair of parallel walls connected by a bottom web and defining a channel, said workpiece being positioned between said walls, the axis of said outer contour of said workpiece lying transverse in said channel;
a fixing member in said channel arranged at a right angle relative to the feeding assembly and movable in the direction of the workpiece axis, said fixing member associated with one of said pair of parallel walls;
a stationary sensor coupled with one of said parallel walls of said feeding assembly, said stationary sensor locating said workpiece in said channel of said feeding assembly; and
position identifying means including two sensors for identifying the lateral position of said workpiece, said two sensor positioned above said channel beside each other in transverse direction between said walls, said position identifying means including at least one lifting cylinder unit having a movable part with said at least two sensors which record the contour of the workpiece in axial direction, and said identifying means determining the difference in travel between the two movable sensors and identifying the lateral position of said workpiece.

3. An apparatus for identifying the lateral position of a workpiece, according to claim 2,
characterised in that the axis of the lifting cylinder unit (19) extends at a right angle relative to the workpiece axis or the feeding device.

4. An apparatus for identifying the lateral position of a workpiece, according to claim 3, characterized in that the sensors (22, 23) of the movable part of the lifting cylinder unit (19) are fixed so as to be adjustable relative to each other in the direction of movement of said part or transversely relative thereto.

5. An apparatus for identifying the lateral position of a workpiece, according to claim 3, characterized in that the sensors (22, 23) of the movable part of the lifting cylinder unit (19) are arranged so as to be spring-loaded in the direction of the lifting movement.

6. An apparatus for identifying the lateral position of a workpiece, according to claim 3, characterized in that the sensors (17, 22, 23) comprise path recording points (16, 24, 25) at their ends pointing in the direction of the workpiece (2).

7. An apparatus for identifying the lateral position of a workpiece, according to claim 2
characterised in that the sensors (22, 23) of the movable part of the lifting cylinder unit (19) are fixed so as to be adjustable relative to each other in the direction of movement of said part or transversely relative thereto.

8. An apparatus for identifying the lateral position of a workpiece, according to claim 7, characterized in that the sensors (22, 23) of the movable part of the lifting cylinder unit (19) are arranged so as to be spring-loaded in the direction of the lifting movement.

9. An apparatus for identifying the lateral position of a workpiece, according to claim 7, characterized in that the sensors (17, 22, 23) comprise path recording points (16, 24, 25) at their ends pointing in the direction of the workpiece (2).

10. An apparatus for identifying the lateral position of a workpiece, according to claim 2
characterised in that the sensors (22, 23) of the movable part of the lifting cylinder unit (19) are arranged so as to be spring-loaded in the direction of the lifting movement.

11. An apparatus for identifying the lateral position of a workpiece, according to claim 10, characterized in that the sensors (17, 22, 23) comprise path recording points (16, 24, 25) at their ends pointing in the direction of the workpiece (2).

12. An apparatus for identifying the lateral position of a workpiece, according to claim 2,
characterised in that the sensors (17, 22, 23) comprise path recording points (16, 24, 25) at their ends pointing in the direction of the workpiece (2).

13. An apparatus for identifying the lateral position of a workpiece, according to claim 2,
characterised in that in the position of rest of the workpiece (2), the stationary sensor (17) is arranged directly opposite the fixing member (4).

14. An apparatus for identifying the lateral position of a workpiece, according to claim 2, characterised in that the sensors (22, 23) of the lifting cylinder (19) consist of tactile sensors.

15. An appararus for identifying the lateral position of a workpiece, according to claim 2, characterised in that the fixing cylinder (4) is a pressure cylinder.

16. An apparatus for identifying the lateral position of a workpiece according to claim 2, characterised in that the feeding assembly of the workpiece (2) is a feeding groove (3).

* * * * *

UNITED STATES PATENT AND TRADEMARK OFFICE
CERTIFICATE OF CORRECTION

PATENT NO. : 5,182,866
DATED : February 2, 1993
INVENTOR(S) : NORBERT HEYMANN

It is certified that error appears in the above-indentified patent and that said Letters Patent is hereby corrected as shown below:

Column 1, line 41, "tru" should be --true--.

Column 3, line 68, "sensor" should be --sensors--.

Signed and Sealed this

Twelfth Day of April, 1994

*Attest:*

BRUCE LEHMAN

*Attesting Officer*

Commissioner of Patents and Trademarks